Sept. 2, 1952  R. J. McFARLAND  2,608,790
FISH LURE
Filed Oct. 5, 1945

Inventor
Robert J. McFarland
By Robert M. Dunning
Attorney

Patented Sept. 2, 1952

2,608,790

UNITED STATES PATENT OFFICE 2,608,790

FISH LURE

Robert J. McFarland, White Bear Lake, Minn.

Application October 5, 1945, Serial No. 620,446

5 Claims. (Cl. 43—42.46)

My invention relates to an improvement in fish lure wherein it is desired to provide an attractive bait for use in fishing.

Various types of lures have previously been used which embody some means of rotating or spinning the body of the lure as it travels through the water. These lures often have certain disadvantages. In the first place a spinning lure often tangles or twists the supported hooks in such a way as to render the hooks partially or wholly ineffective or to detract from the appearance of the bait. Furthermore, I have found that it is sometimes advantageous to spin the lure at a higher rate of speed than at other times. Such adjustment of the rotating speed of the lure has been usually practical only by varying the speed with which the lure travels through the water.

It is the object of the present invention to provide a lure having vanes fixed to opposite sides thereof which act to spin the body of the lure as it travels through the water. These vanes are so affixed that the angle or pitch of the blades may be varied so as to vary the speed of rotation of the lure.

A further object of the present invention is to provide a means of supporting the hooks of the lure so that they may at all times depend freely from the lure. As a result the body of the lure may spin freely at any desired rate of speed, but the hooks are at all times depending downwardly at the most effective angle to catch a fish attacking the lure.

A feature of the present invention lies in providing vanes or blades in angularly spaced relation about the body of the lure which are variable in pitch. By changing the angle of these blades the speed of rotation of the lure may be regulated.

A further feature of the present invention lies in the provision of indicia cooperating with the blades or vanes to indicate various blades settings. As a result all of the vanes or blades may be adjusted to the same angle relative to a plane through the axis of rotation of the lure and through the axis of pivotal adjustment of each vane.

A further feature of the present invention resides in the specific method employed to support the hooks on the lure. A screw eye extends into the body of the lure at each end thereof. A supporting ring of a diameter less than the diameter of the screw eye head is freely supported on the shank of the screw eye between the head thereof and the body of the lure. A second ring, preferably of larger diameter, is linked through the first named ring. A hook element having an attaching eye is threaded through this second ring. As a result the lure may spin or rotate about a longitudinal axis without catching upon or rotating the supported hooks.

A further feature of the present invention resides in the manner of attachment of the lure to the line. The screw eye anchored in one end of the lure has a ring of somewhat larger diameter linked therethrough. This ring is also linked through one end of a swivel connector. The diameter of the connecting ring between the screw eye and the swivel is such that it can not frictionally engage over either the screw eye or the swivel, thereby automatically becoming properly positioned when a pull is exerted upon the line, tending to draw the lure through the water.

A feature of the present invention resides in the fact that in one form of construction the screw eyes mounted at opposite ends of the lure may be off-set from the longitudinal center of the lure body, thereby creating an eccentric movement as the lure travels through the water. With such a construction the lure body wobbles to some extent as it rotates, causing an uneven movement somewhat simulating that of a fish.

These and other objects and novel features of my invention will be more clearly and fully set forth in the following specification and claims.

In the drawings forming a part of my specification:

Figure 1:
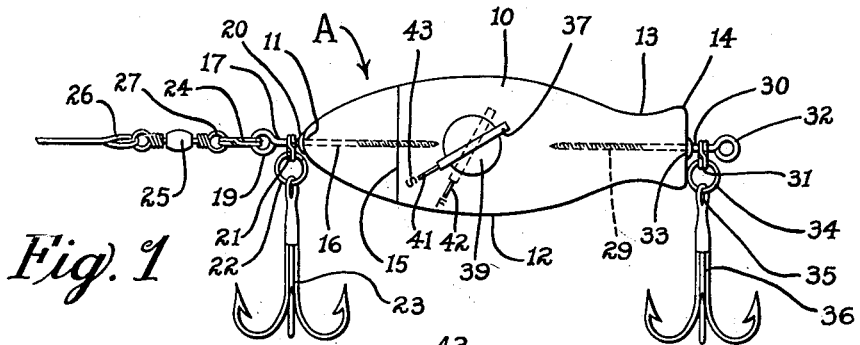
Figure 1 is a side elevational view of my lure showing the construction thereof.
Figure 2:
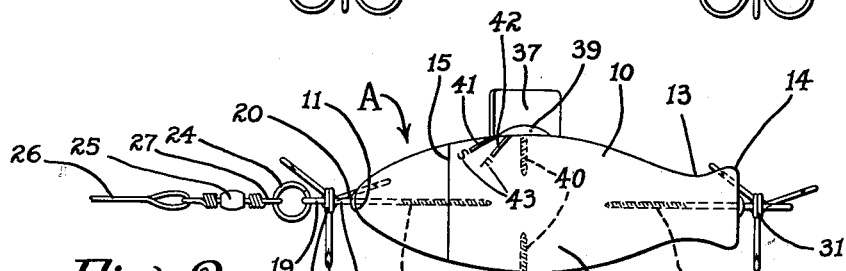
Figure 2 is a top plan view of the lure.

The lure A, illustrated in Figures 1 and 2 of the drawings, is provided with a body 10 simulating somewhat in outline the profile shape of a fish or minnow. The body 10 is preferably provided with a rounded forward end 11, the body gradually increasing to a mid-point of greatest diameter 12 spaced substantially from the ends of the body. The body 10 tapers to a restricted point 13 of relatively small diameter and then tapers outwardly at the rear end 14 somewhat simulating the fan shape of the tail of a minnow. In preferred form the forward end of the body forwardly of the dividing line 15 is colored red, while the remainder of the body is white.

Extending axially into the body 10 I provide a screw eye 16 having a projecting shank portion 17 projecting beyond the forward end 11 of the lure and terminating in an eye 19. A bearing plate or flange 20 may, if desired, extend about the shank 17 against the rounded forward end 11 of the body, providing a bearing plate overlying the adjacent surface of the body. A ring 21 of a diameter smaller than that of the screw eye 19 encircles the projecting portion 17 of the shank of the screw eye. This ring 21 is thus prevented from frictionally engaging the arcuated surface of the eye 19 and is held in place thereby. The ring 21 is obviously freely rotatable about the shank 17.

A ring 22 of somewhat larger diameter than the ring 21 is linked through the ring 21 and is supported thereby. The diameter of the ring 22 is of such proportion to the diameter of the ring 21 that the ring 22 can not extend over the eye 19 during the casting process. During the casting and other movement of the lure the ring 22 might otherwise have a tendency of catching over the eye 19, thereby preventing proper operation of the bait.

A hook element 23 which is preferably of the triple hook type is supported by the ring 22. The weight of the hook normally causes the same to depend downwardly as the lure travels through the water and the supporting element is such that it is extremely difficult for the hook to become fouled during either the casting process or during the movement of the lure while in the water.

A ring 24 is looped through the eye 19 to connect this eye with the swivel 25. The swivel 25 is of any common type and is connected at its forward end to the leader or line 26. The ring 24 is of substantially larger diameter than either the eye 19 or the loop end 27 of the leader 25 so that this ring 24 can not lock over either the eye or the loop end. As a result when a pull is exerted on the leader or line 26 the ring 24 will straighten out as illustrated in Figures 1 and 2 in a manner to cause a direct pull.

At the opposite end of the body 10 I provide a screw eye 29 which extends axially into the body 10. A portion 30 of the shank of the screw eye projects beyond the end of the body to form a support for a ring 31. An eye 32 is provided on the outer end of the screw eye 29, and a disc shaped flange 33 may be secured to the shank if desired to abut against the end of the lure body 10. The ring 31 is of smaller diameter than the eye 32 so that it may freely rotate about the exposed portion 30 of the shank between the flange 33 and the head 32.

A ring 34 of larger diameter than the ring 31 is looped through this ring 31 and also through the eye 35 of the hook assembly 36. The hook assembly 36 is preferably a triple hook as illustrated.

The diameter of the ring 34 is substantially larger than the ring 33, but this ring 34 is not of sufficient size to engage over the eye 32, thus preventing the connecting links from binding.

A pair of vanes or blades 37 are provided with substantially circular flanged heads 39 and a threaded shank 40. The flanged heads 39 engage against the sides of the lure body 10 or may be slightly counter-sunk into the body. The threaded shanks 32 are screwed into the body 10 until the heads frictionally engage the sides of the body. While in this position the blades or vanes 37 may be rotated through a limited angularity without losing frictional engagement with the body.

Adjacent the ends of the vanes 37 on each side of the body I provide indicia or gage marks such as 41 and 42. These gage marks are marked with suitable indicia 43 so that the marks can be distinguished one from the other. As a result the vanes or blades 37 may be turned to the same relative angularity on opposite sides of the lure, one vane being arranged with its forward end below a plane through the axis of the lure and through the axis of rotation of the vane, and the other vane being arranged with its forward end above this same plane. For example, as will be noted in Figure 2 of the drawings the vane 37 which appears uppermost in the drawing is arranged with its forward end above a horizontal plane, while the vane 37 at the lower extremity of this figure is arranged with its forward end below the horizontal plane. As a result movement of the lure through the water will cause the body 10 to spin about its longitudinal axis.

I have found that when the body 10 rotates at a relatively high rate of speed the rotation carries the lure near the surface of the water. On the other hand when the spinning movement of the lure is somewhat slower the bait has a tendency to penetrate more deeply into the water. Thus in using the lure the position of the vanes 37 may be adjusted to compensate both for the speed with which the lure is travelling through the water and also for the desired depth at which the lure should travel.

Figure 3:
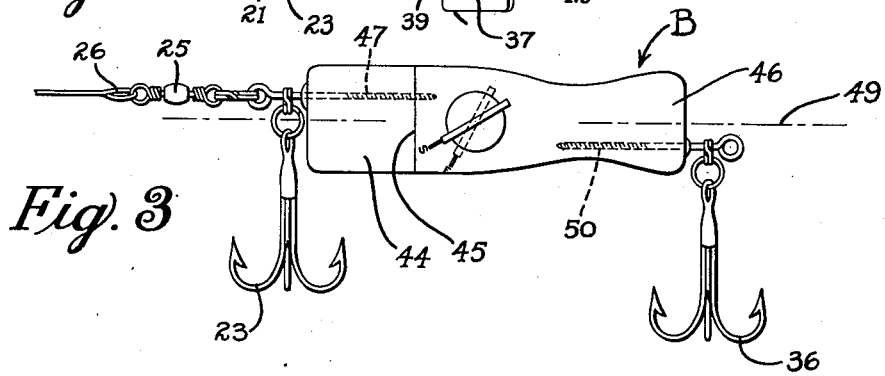
Figure 3 is a side elevational view of a modified form of lure.
Figure 4:
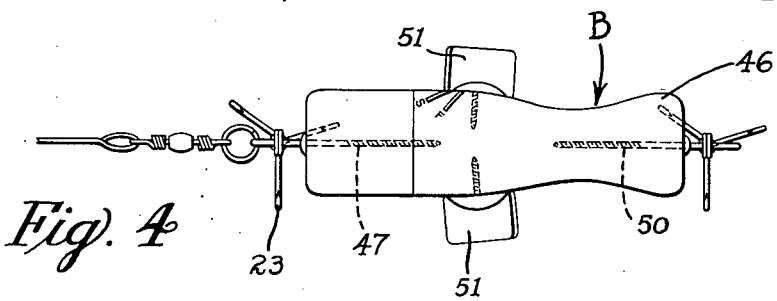
Figure 4 is a top plan view of the form of construction shown in Figure 3.

In Figures 3 and 4 of the drawings I disclose a lure B which is very similar in most respects to that previously described, with the exception of the fact that the screw eyes entering opposite ends of the lure are off-set from the longitudinal axis of the lure. It will be noted that the lure body 44 is provided with a red colored forward end forwardly of the line 45 and a white colored portion 46 rearwardly of the line 45. A screw eye 47 enters the forward end of the lure body at a point off-set from the longitudinal axis of the lure which is designated by the line 49. A screw eye 50 enters the opposite end of the lure at a point equally spaced on the other side of the line 49. As a result the rotation of the body 46 causes a wobbling motion of the bait which would not be found in the lure A.

In other respects the lure B is similar in principle, if not in shape, to the lure A. The screw eye 47 corresponds to the screw eye 16 of the lure A and is similarly equipped to support the hook 23. The screw eye 50 is similar to the screw eye 29 of the lure A and is similarly equipped to support the hook 36. The hooks 23 and 36 are supported by the same ring linkage as has been previously described and the screw eye 47 is similarly connected to the swivel 25 and the leader or line 26.

Rotation or spinning movement of the body 46 is caused by vanes 51, similar to or identical with the vanes 37. The vanes 51 are attached in a manner previously described and may be adjusted in the manner previously outlined.

It will be noted from an observation of the drawings that my lure can be caused to dive or to remain on the surface of the water without spinning, if both of the vanes 37 or 51 are adjusted to lie with their forward ends both above or below a horizontal plane through the axis of the lure. I prefer, however, that the vanes be arranged for spinning the lure as previously described.

In accordance with the patent statutes, I have described the principles of construction and operation of my fish lure, and while I have endeavored to set forth the best embodiments thereof, I desire to have it understood that obvious changes may be made within the scope of the following claims without departing from the spirit of my invention.

I claim:

1. A lure comprising an elongated body, a screw eye extending into one end of said body, an exposed shank portion on said screw eye, a ring on said shank of smaller diameter than the eye of said screw eye, a hook, and a second ring connecting said first named ring and said hook, said second ring being larger than said first named ring and having an internal diameter smaller than the external diameter of said eye.

2. A lure comprising an elongated body, a screw eye extending from one end thereof, an exposed shank portion between the eye of said screw eye and said lure body, a ring encircling said exposed shank portion, a hook, a second ring connecting said first ring and said hook, said second ring being larger than said first named ring but having an internal diameter smaller than the internal diameter of said eye, a third ring extending through said screw eye, said third ring being of substantially larger diameter than said screw eye and a swivel connected to said third ring.

3. A lure comprising an elongated body, a screw eye extending into each end of said body, said screw eyes being arranged on opposite sides of the longitudinal axis of said body, an exposed shank portion on each of said screw eyes, said shank portions being substantially parallel to said longitudinal axis, a first ring loosely mounted on each said exposed shank portion, said first rings being held in place by the eyes of said screw eyes, a pair of hooks and second rings connecting said first rings to said hooks, and means for rotating said body about said longitudinal axis.

4. A lure comprising an elongated body, a screw eye having a threaded shank extending into said body at each end thereof, a ring rotatably supported and freely encircling each shank of the screw eye between the eye thereof and the lure body, said rings being of smaller diameter than said eyes, each of said first mentioned rings having a second ring extending through, said second ring being larger than said first named ring but having an internal diameter smaller than the external diameter of said eye, and a hook supported by each said second ring.

5. A lure comprising an elongated body, journal means projecting from each end of said body in an oppositely offset relation to the longitudinal axis of said body, said journal means being substantially parallel to said longitudinal axis, bearing means encircling each journal means, a hook carried by each bearing means, and means for rotating said body about said longitudinal axis.

ROBERT J. McFARLAND.

REFERENCES CITED

The following references are of record in the file of this patent:

UNITED STATES PATENTS

| Number | Name | Date |
| --- | --- | --- |
| 489,110 | Welch | Jan. 3, 1893 |
| 1,220,921 | Wilson | Mar. 27, 1917 |
| 1,232,211 | Burkman | July 3, 1917 |
| 1,816,725 | Freeman | July 28, 1931 |
| 1,832,037 | Meehan | Nov. 17, 1931 |
| 2,005,985 | Bear | June 25, 1935 |
| 2,011,075 | Pflueger | Aug. 13, 1935 |
| 2,017,903 | Johnson | Oct. 22, 1935 |
| 2,243,663 | Wareham | May 27, 1941 |
| 2,459,288 | Robbins et al. | Jan. 18, 1949 |

FOREIGN PATENTS

| Number | Country | Date |
| --- | --- | --- |
| 19,132 | Great Britain | of 1903 |
| 23,482 | Great Britain | of 1899 |